United States Patent
Bühle et al.

(10) Patent No.: US 10,309,529 B2
(45) Date of Patent: Jun. 4, 2019

(54) METHOD FOR OPERATING A DRIVETRAIN OF A MOTOR VEHICLE, AND DRIVETRAIN MODULE OF MOTOR VEHICLE OF SAID TYPE

(71) Applicant: ZF Friedrichshafen AG, Friedrichshafen (DE)

(72) Inventors: Felix Bühle, Eriskirch (DE); Falko Platzer, Friedrichshafen (DE); Thomas Lemp, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 99 days.

(21) Appl. No.: 15/492,576

(22) Filed: Apr. 20, 2017

(65) Prior Publication Data

US 2017/0307071 A1   Oct. 26, 2017

(30) Foreign Application Priority Data

Apr. 21, 2016  (DE) ........................ 10 2016 206 731

(51) Int. Cl.
| | |
|---|---|
| *F16H 61/14* | (2006.01) |
| *B60W 20/00* | (2016.01) |
| *B60K 25/02* | (2006.01) |
| *F16H 61/00* | (2006.01) |
| *B60K 25/00* | (2006.01) |

(52) U.S. Cl.
CPC ........... *F16H 61/143* (2013.01); *B60K 25/02* (2013.01); *B60W 20/00* (2013.01); *F16H 61/0031* (2013.01); *B60K 2025/005* (2013.01); *B60K 2025/022* (2013.01); *B60Y 2200/92* (2013.01); *B60Y 2300/18025* (2013.01); *B60Y 2300/421* (2013.01); *Y10S 903/946* (2013.01)

(58) Field of Classification Search
None
See application file for complete search history.

(56) References Cited

U.S. PATENT DOCUMENTS

| | | |
|---|---|---|
| 6,692,402 B2 | 2/2004 | Nakamori et al. |
| 7,744,502 B2 | 6/2010 | Dreibholz et al. |
| 7,951,043 B2 | 5/2011 | Reisch et al. |
| 8,187,151 B2 | 5/2012 | Gloge |

(Continued)

FOREIGN PATENT DOCUMENTS

| | | |
|---|---|---|
| DE | 10162973 A1 | 8/2002 |
| DE | 102005013137 A1 | 9/2006 |

(Continued)

*Primary Examiner* — Timothy Hannon
(74) *Attorney, Agent, or Firm* — Dority & Manning, P.A.

(57) ABSTRACT

A method for operating a drivetrain of a motor vehicle, includes, when the motor vehicle is at a standstill and upon demand for a drive torque of the motor vehicle, increasing power (25$p$) supplied to a separate electric pump drive (25) such that a pressure chamber whose pressurization effects a complete closure or lock-up of a launch element (3) is fast charged with hydraulic pressure from a pump (24). The method also includes performing a launch process of the motor vehicle with the drive source (1) and with a closed or locked-up launch element (3) and reducing the power (25$p$) supplied to the separate electric pump drive (25) after fast charging the pressure chamber. A related drive train module is also provided.

6 Claims, 4 Drawing Sheets

(56) References Cited

U.S. PATENT DOCUMENTS

2012/0238404 A1* 9/2012 Schiele .................... B60K 6/48
477/5
2014/0073479 A1* 3/2014 Bader .................... B60W 10/02
477/5

FOREIGN PATENT DOCUMENTS

DE    102006018058 A1    11/2007
DE    102008040665 A1    6/2010

* cited by examiner

METHOD FOR OPERATING A DRIVETRAIN OF A MOTOR VEHICLE, AND DRIVETRAIN MODULE OF MOTOR VEHICLE OF SAID TYPE

FIELD OF THE INVENTION

The invention relates generally to a method for operating a drivetrain of a motor vehicle, and to a drivetrain module of a motor vehicle of said type.

BACKGROUND

The drivetrain of a conventional motor vehicle with an internal combustion engine as the sole drive source normally has a launch element in the power flow between drive source and drive wheels for the purposes of permitting a launch process of the motor vehicle. Examples of such a launch element are hydrodynamic torque converters or friction clutches. The drivetrain of a motor vehicle with an electric motor as the sole drive source generally does not require a launch element because the electric motor can accelerate the vehicle from a standstill.

The drivetrain of a parallel hybrid vehicle normally requires a launch element if it is also sought for a launch process to be performed by the internal combustion engine alone. For the electric launching of a motor vehicle with parallel hybrid drivetrain, numerous variants are known in the prior art. The applicant's patent application publication DE 10 2006 018 058 A1 discloses a variety of launch processes for a motor vehicle with parallel hybrid drivetrain. FIG. 4 shows profiles with respect to time in the case of a purely electrically driven launch process with a slipping converter lock-up clutch, and FIG. 5 illustrates such profiles with a closed converter lock-up clutch. A method for providing the pressure for closing the converter lock-up clutch in the case of launch behavior as per FIG. 5 is not disclosed here.

The patent application publication DE 101 62 973 A1 discloses a hybrid drivetrain of said type, with a mechanical oil pump and an electric oil pump. The mechanical oil pump can be driven by the motor-generator of the drivetrain. The electric oil pump is driven by a dedicated electric motor. The electric oil pump is actuated in a manner dependent on different operating states of the drivetrain in order to supply oil pressure to a hydraulic control device of the transmission.

SUMMARY OF THE INVENTION

A launch process with a closed or locked-up launch element is particularly energy-efficient, because no energy that is imparted by the drive source is lost as a result of slippage between the drive source and drive wheels. It is now an example object of the invention to specify a method for operating a drivetrain, by which method fast operational readiness of the drivetrain is ensured with simultaneously low energy outlay.

The method is suitable for the operation of a motor vehicle drivetrain which includes at least one drive source in the form of an electric motor, a transmission for providing different transmission ratios between a drive shaft and an output shaft of the transmission, a launch element in the power flow between the drive source and the output shaft, and a pump, which can be electrically driven independently of the drive source by a separate electrical pump drive and which serves for the hydraulic supply of pressure to the transmission. The electric motor may serve either as the sole drive source in the drivetrain, or may operate together with an internal combustion engine in a hybrid drivetrain. The launch element may be arranged outside or within the transmission. The pump may be structurally integrated into the transmission.

According to example aspects of the invention, when the motor vehicle is at a standstill and in the presence of a demand for the provision of a drive torque of the motor vehicle, the power supplied to the pump drive is increased. In this way, it is possible to briefly make available an oil pressure sufficient for performing fast charging of that pressure chamber whose pressurization effects the complete closure or lock-up of the launch element. If a gear ratio between drive shaft and output shaft is formed by non-positively locking shift elements (e.g., friction shift elements) with hydraulic actuation, it is also possible to perform fast charging of said elements. Following this, a launch process, driven by the electric motor, of the motor vehicle is performed with a closed or locked-up launch element. The power supplied to the pump drive is in this case reduced after the fast charging has been performed, whereby the energy consumption of the pump is also reduced. This improves the energy efficiency of the drivetrain.

It is preferably provided that the power supplied to the pump drive is, after the fast charging has been performed, reduced to a value which is dependent on the setpoint drive torque. The setpoint drive torque may for example correspond to an accelerator pedal position. In this way, the energy consumption of the pump can be reduced to a minimum in that, in the presence of a low setpoint drive torque, a correspondingly low setpoint pressure of the pump is output. The power supplied to the pump drive is in this case preferably just high enough that slippage of the launch element or of the shift elements of the transmission can still just be prevented in the case of the present drive torque.

In a preferred refinement, the reduction of the power supplied to the pump drive is performed in continuous or stepped fashion. In other words, an abrupt reduction of the power supplied to the pump drive is intentionally avoided in order to at any rate prevent a sudden occurrence of slippage of the launch element or of the shift elements of the transmission. In this way, high operational reliability and a high level of driving comfort are ensured.

It is preferably the case that, after the fast charging has been performed, the power supplied to the pump drive is reduced only after a predetermined rotational speed value of the electric motor has been reached or overshot. This is relevant in particular if the pump can also be driven by the drive source, or if a second pump which is driven by the drive source is available for the hydraulic supply of pressure to the transmission. As soon as the supply of pressure to the launch element, or the locking-up thereof, and to the shift elements of the transmission is performed by operation of the drive source, the separate pump drive can be deactivated.

The predetermined rotational speed value for the reduction of the power supplied to the pump drive may be temperature-dependent, for example dependent on the ambient temperature or on the temperature of the transmission oil. This is because, in the case of cold transmission oil, the oil is more viscous, whereby the gap losses are lower than in the case of warm transmission oil. It is thus possible, in the presence of cold transmission oil, for a high pressure to be built up even at low rotational speeds.

In addition to the method according to example aspects of the invention, a drivetrain module of a motor vehicle is also specified. The drivetrain module includes at least one drive source in the form of an electric motor, an interface to an internal combustion engine of the motor vehicle, a control unit, a transmission for providing different transmission ratios between a drive shaft and an output shaft of the transmission, a launch element which can be hydraulically actuated or locked up and which is situated in the power flow between the drive source and the output shaft, and a pump, which can be driven independently of the drive source by means of a separate electric pump drive and which serves for the hydraulic supply of pressure to the transmission. Here, the control unit is set up for controlling the method as described above.

BRIEF DESCRIPTION OF THE DRAWINGS

Exemplary embodiments of the invention will be described in detail below on the basis of the appended figures. Identical and similar components are in this case denoted by the same reference designations. In the figures.

DETAILED DESCRIPTION

Figure 1:
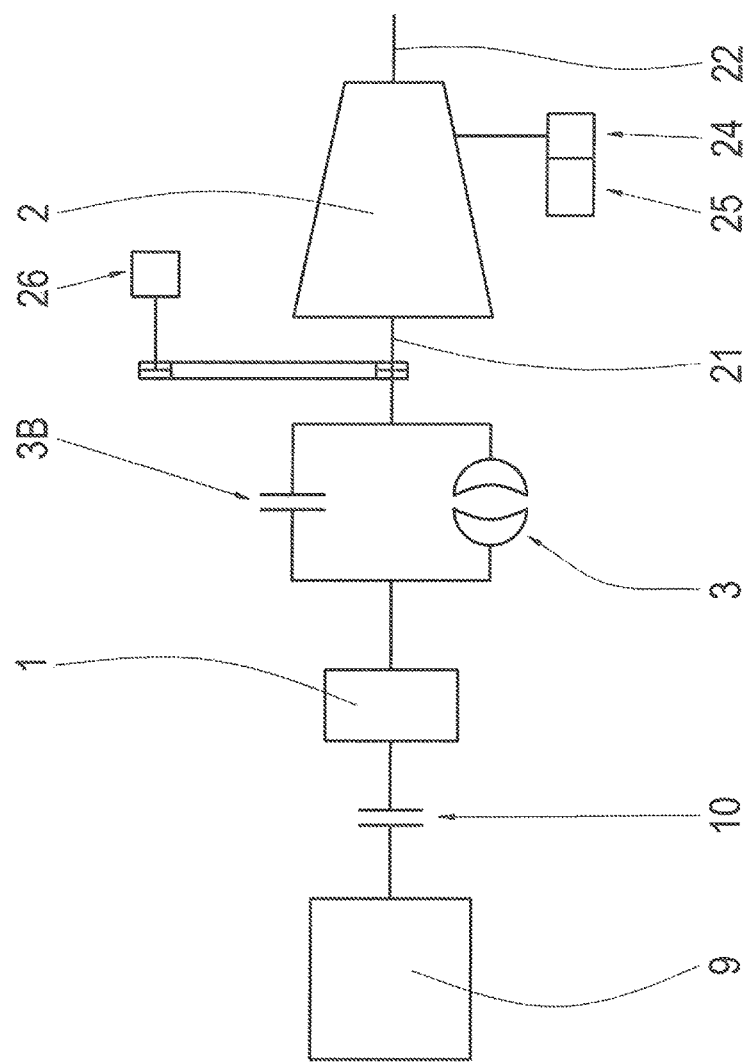
FIG. 1 shows a parallel hybrid drivetrain with a hydrodynamic torque converter as launch element.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drivetrain, in the form of a parallel hybrid drivetrain, of a motor vehicle. The drivetrain has an internal combustion engine 9 and a drive source 1 in the form of an electric motor, wherein a separating clutch 10 is connected between the internal combustion engine 9 and the electric motor 1. Furthermore, the drivetrain of FIG. 1 includes a transmission 2 with a drive shaft 21 and an output shaft 22, and also a launch element 3, wherein the launch element 3 is positioned between the electric motor 1 and the drive shaft 21. The launch element 3 is a hydrodynamic torque converter which can be locked up by a lock-up clutch 3B connected in parallel. The output shaft 22 is connected in terms of drive to drive wheels of the motor vehicle.

If it is the intention that a motor vehicle equipped with the drivetrain of FIG. 1 be launched using the electric motor 1 alone, this may be performed with a slipping converter or with a converter locked up by the closed lock-up clutch 3B. In the case of a launch process with a slipping converter, the electric motor 1 may run at any desired rotational speed, while the output shaft 22 is stationary, for example as a result of actuation of a service brake of the motor vehicle. In the case of a launch process with a closed lock-up clutch 3B, the rotational speeds of electric motor 1 and output shaft 22 are coupled by the transmission ratio selected in the transmission 2.

For the supply of oil pressure to the transmission 2, a pump 26 is provided which is driven by the drive shaft 21 by a chain drive. However, if the drive shaft 21 is stationary, the pump 26 cannot provide an oil pressure. For this purpose, a pump 24 is provided which can be driven by a separate electric pump drive 25. This is to be regarded merely as an example. As an alternative to this example embodiment, it would be possible for the pump 26 to be equipped with a dedicated electric drive by which the pump 26 can be driven independently of the drive shaft 21. To avoid a situation in which said dedicated electric drive drives the drive shaft 21, it is possible for a freewheel or a switching element to be provided in the operative connection between drive shaft 21 and pump 26.

Figure 2:
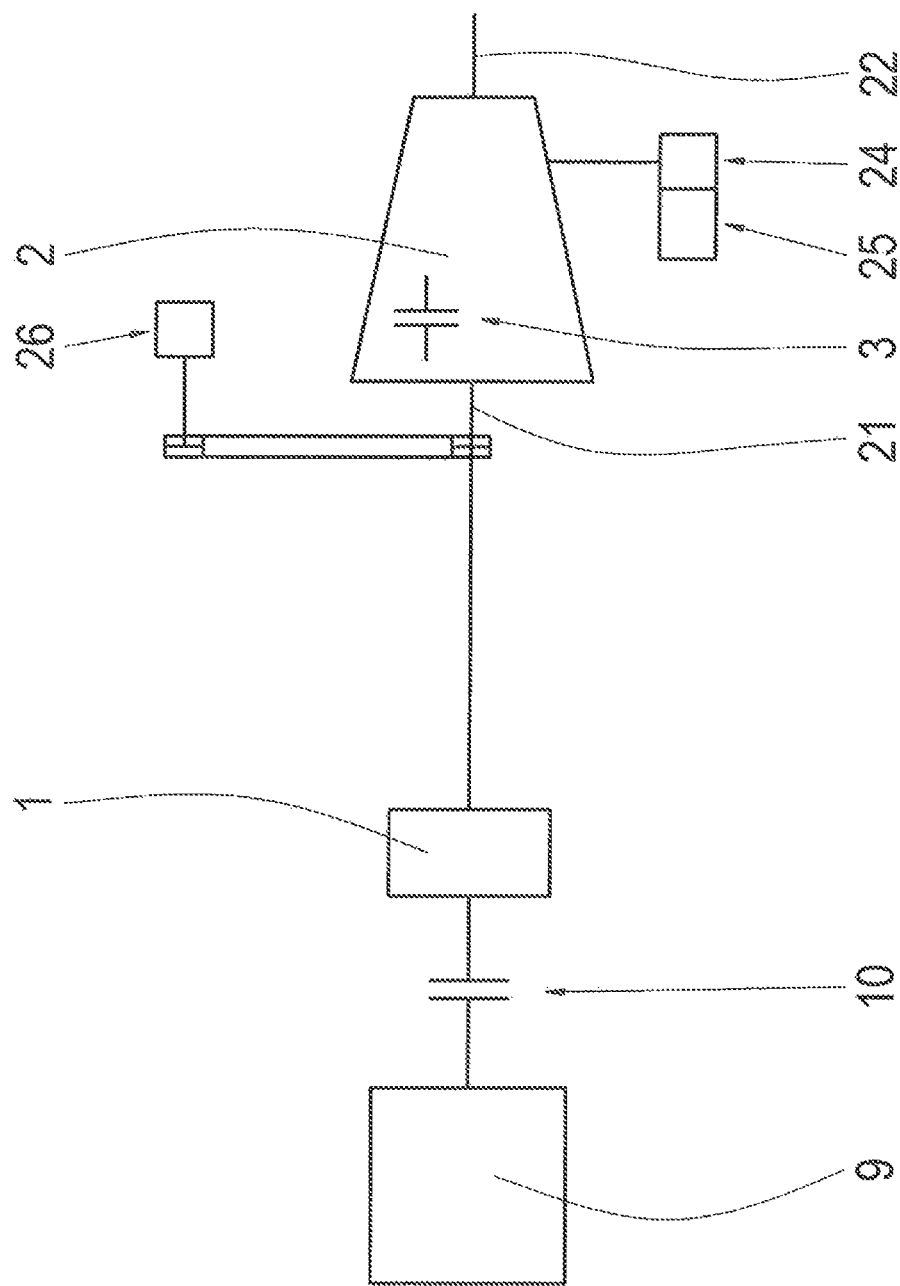
FIG. 2 shows a parallel hybrid drivetrain with a launch element integrated in the transmission.

FIG. 2 schematically shows a drivetrain, in the form of a parallel hybrid drivetrain, of a motor vehicle, wherein the launch element 3 is now integrated into the transmission 2. The launch element 3 may for example be one of the shift elements which contributes to the formation of the transmission ratios of the transmission 2. The electric motor 1 is fixedly connected to the drive shaft 21. The output shaft 22 is connected in terms of drive to drive wheels of the motor vehicle. The supply of oil pressure to the transmission 2 corresponds to the embodiment as per FIG. 1, for which reason reference is made to the statements relating to FIG. 1.

If it is the intention that a motor vehicle equipped with the drivetrain of FIG. 2 be launched using the electric motor 1 alone, this may be performed with a slipping launch element 3 or with a closed launch element 3. In the case of a launch process with a slipping launch element 3, the electric motor 1 may run at any desired rotational speed, while the output shaft 22 is stationary, for example as a result of actuation of a service brake of the motor vehicle. In the case of a launch process with a closed launch element 3, the rotational speeds of electric motor 1 and drive-output shaft 22 are coupled by the transmission ratio selected in the transmission 2.

When purely electric driving is performed with the drivetrain as per FIG. 1 or FIG. 2, the internal combustion engine 9 is typically deactivated, and the separating clutch 10 connected between the internal combustion engine 9 and the electric motor 1 fully opened. By contrast, during hybrid operation, in which both the internal combustion engine 9 and the electric motor 1 are running and provide drive torque, the separating clutch 10 positioned between the internal combustion engine 9 and the electric motor 1 is closed.

The operation of the internal combustion engine 9 is controlled and/or regulated by an engine controller, and the operation of the transmission 2 is controlled and/or regulated by a transmission controller. For the control and/or regulation of the operation of the electric motor 1, a hybrid controller is typically provided. The launch element 3, or the lock-up clutch 3B, is controlled and/or regulated by a launch element controller.

Typically, the launch element controller and the transmission controller are implemented in a common control device, specifically in a transmission control device. The hybrid controller may also be a constituent part of the transmission control device. The engine controller is typically a constituent part of a separate control device, specifically of an engine control device. The engine control device and transmission control device exchange data with one another.

Figure 3:
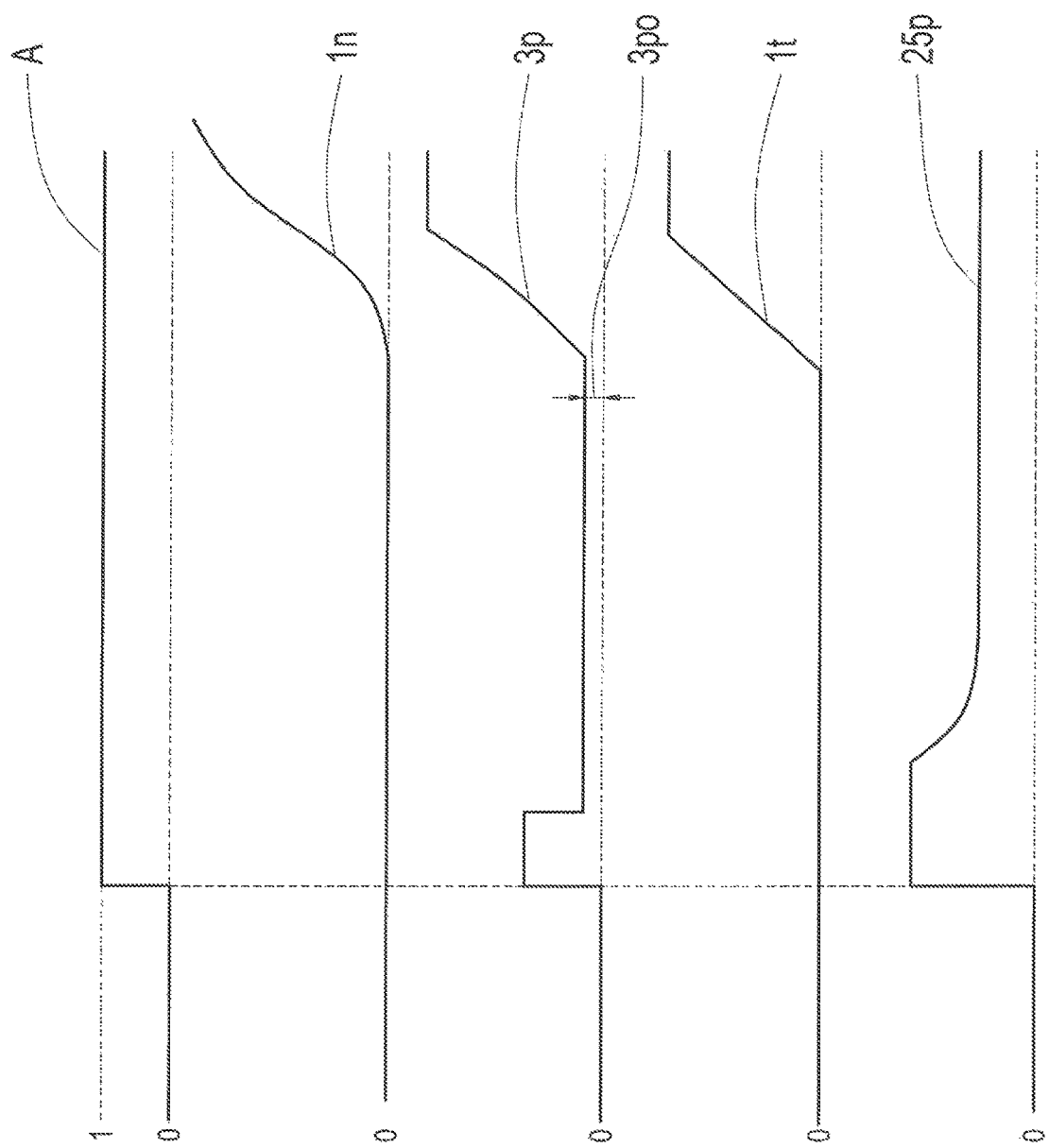
FIG. 3 and FIG. 4 show profiles of different variables of the drivetrain with respect to time.

FIG. 3 shows the profile of different variables of the drivetrain with respect to time, including a selection A of the launch process, a rotational speed $1n$ of the electric motor 1, a pressure $3p$ for the closure or locking-up of the launch element 3, a torque $1t$ of the electric motor 1, and the power $25p$ supplied to the pump drive 25. The selection A of the launch process can assume two different values, wherein the value one signifies a launch process with a closed or locked-up launch element 3, and the value zero signifies a launch process with a slipping launch element 3. The power 25p supplied to the pump drive 25 may for example be an electrical current in the case of a constant supply voltage.

The illustrated exemplary profile shows a launch process with a closed or locked-up launch element 3. Before the commencement of the launch process, a launch process with a closed or locked-up launch element 3 is selected, whereby the parameter A assumes the value one. Electrical power is thereupon supplied to the pump drive 25, such that the rotational speed thereof increases. The pump 24 now provides oil pressure, such that the launch element 3, or the lock-up clutch 3B thereof, can be closed. The pressure 3p is initially raised to a first level for the purposes of charging the oil chamber in order to close or lock up the launch element 3. After charging has been performed, the power 25p is reduced in continuous fashion to a residual level. This may take place for example after a predefined time has elapsed since the commencement of the charging. After the fast charging has been performed, the pressure 3p is reduced to a setpoint value 3po. The setpoint value 3po is just high enough that, upon the commencement of the launch process, the launch element 3, or the lock-up clutch thereof, reliably transmits the drive torque. At a later point in time, torque 1t and rotational speed 1n increase. Here, a gear ratio is engaged in the transmission 2, whereby launching of the motor vehicle occurs.

Figure 4:
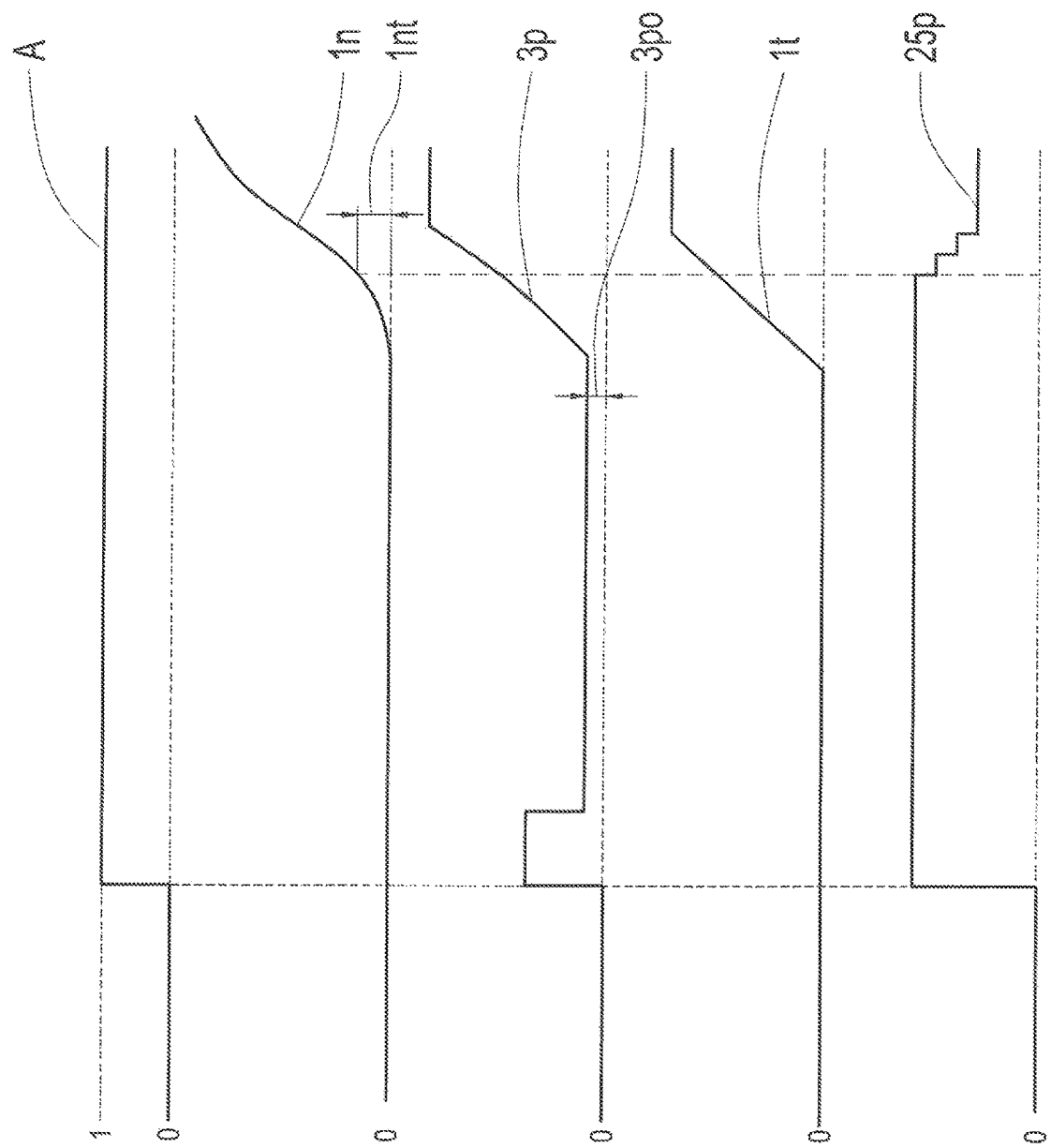

FIG. 4 likewise shows the profile with respect to time of the variables illustrated in FIG. 3 in the case of a launch process with a closed or locked-up launch element 3. By contrast to the sequence illustrated in FIG. 3, the power 25p is, after the fast charging of the launch element 3 or of the lock-up clutch 3B thereof has been performed, reduced only after a rotational speed value 1nt of the electric motor 1 has been reached. Here, the reduction is performed stepwise. The rotational speed value 1nt may be temperature-dependent, wherein the value 1nt becomes lower with falling temperature. The oil temperature of the transmission 2, which is detected by a suitable sensor, may be used as reference temperature.

Modifications and variations can be made to the embodiments illustrated or described herein without departing from the scope and spirit of the invention as set forth in the appended claims.

REFERENCE DESIGNATIONS

1 Drive source
1t Torque of the drive source
1n Rotational speed of the drive source
1nt Rotational speed value
2 Transmission
21 Drive shaft
22 Output shaft
24 Pump
25 Pump drive
25p Power of the pump drive
26 Pump
3 Launch element
3p Pressure
3po Setpoint value
3B Lock-up clutch
9 Internal combustion engine
10 Separating clutch
A Selection

The invention claimed is:

1. A method for operating a drivetrain of a motor vehicle, the drivetrain comprising at least one transmission (2) for providing different transmission ratios between a drive shaft (21) and an output shaft (22) of the transmission (2), a drive source (1) in the form of an electric motor, a launch element (3) which is hydraulically actuatable or lockable and which is situated in power flow between the drive source (1) and the output shaft (22), and a pump (24) which is operable independently of the drive source (1) by a separate electric pump drive (25) and is configured for hydraulic pressure supply to the transmission (2), the method comprising:
when the motor vehicle is at a standstill, and upon demand for a drive torque of the motor vehicle, increasing power (25p) supplied to the separate electric pump drive (25) such that a pressure chamber, whose pressurization effects a complete closure or lock-up of the launch element (3), is fast charged with hydraulic pressure from the pump (24);
performing a launch process of the motor vehicle with the drive source (1) and with a closed or locked-up launch element (3); and
during the launch process, reducing the power (25p) supplied to the separate electric pump drive (25) after fast charging the pressure chamber,
wherein an internal combustion engine (9) of the motor vehicle is off during the launch process.

2. The method of claim 1, wherein reducing the power (25p) supplied to the separate electric pump drive (25) comprises reducing the power (25p) supplied to the pump drive (25) to a value which is dependent on a setpoint drive torque.

3. The method of claim 2, wherein reducing the power (25p) supplied to the pump drive (25) comprises reducing the power (25p) supplied to the separate electric pump drive (25) in a continuous manner or a stepped manner.

4. The method of claim 1, wherein reducing the power (25p) supplied to the separate electric pump drive (25) comprises reducing the power (25p) supplied to the separate electric pump drive (25) after reaching or overshooting a predetermined rotational speed value (1nt) of the drive source (1).

5. The method of claim 4, wherein the predetermined rotational speed value (1nt) of the drive source (1) is temperature-dependent.

6. A drivetrain module of a motor vehicle, comprising:
at least one drive source (1) in the form of an electric machine;
an interface to an internal combustion engine (9) of the motor vehicle;
a control unit;
a transmission (2) for providing different transmission ratios between a drive shaft (21) and an output shaft (22) of the transmission (2);
a launch element (3) which is hydraulically actuatable or lockable and which is situated in power flow between the drive source (1) and the output shaft (22); and
a pump (24) which is operable independently of the drive source (1) by a separate electric pump drive (25) and is configured for hydraulic pressure supply to the transmission (2),
wherein the control unit is programmed for
when the motor vehicle is at a standstill, and upon demand for a drive torque of the motor vehicle, increasing power (25p) supplied to the separate electric pump drive (25) such that a pressure chamber, whose pressurization effects a complete closure or lock-up of the launch element (3), is fast charged with hydraulic pressure from the pump (24), performing a launch process of the motor vehicle with the drive source (1) and with a closed or locked-up launch element (3), and during the launch process, reducing the power (25*p*) supplied to the separate electric pump drive (25) after fast charging the pressure chamber, wherein the control unit is programmed such that the internal combustion engine (9) of the motor vehicle is off during the launch process.

\* \* \* \* \*